(12) United States Patent
Park et al.

(10) Patent No.: US 12,452,529 B2
(45) Date of Patent: Oct. 21, 2025

(54) METHOD AND APPARATUS WITH HYPERLAPSE VIDEO GENERATION

(71) Applicant: SAMSUNG ELECTRONICS CO., LTD., Suwon-si (KR)

(72) Inventors: Changbeom Park, Suwon-si (KR); Dongwook Lee, Suwon-si (KR); Byung In Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 18/308,497

(22) Filed: Apr. 27, 2023

(65) Prior Publication Data
US 2024/0147053 A1    May 2, 2024

(30) Foreign Application Priority Data
Nov. 1, 2022  (KR) .................. 10-2022-0143745

(51) Int. Cl.
*H04N 23/60* (2023.01)
*H04N 5/262* (2006.01)
*H04N 23/63* (2023.01)
*H04N 23/69* (2023.01)
*H04N 23/695* (2023.01)

(52) U.S. Cl.
CPC .......... *H04N 23/64* (2023.01); *H04N 5/2625* (2013.01); *H04N 23/632* (2023.01); *H04N 23/633* (2023.01); *H04N 23/69* (2023.01); *H04N 23/695* (2023.01)

(58) Field of Classification Search
CPC .... H04N 23/64; H04N 5/2625; H04N 23/632; H04N 23/633; H04N 23/69; H04N 23/695; H04N 23/61; H04N 23/80; H04N 23/95; H04N 23/67; H04N 5/915; H04N 23/62
See application file for complete search history.

(56) References Cited

U.S. PATENT DOCUMENTS

| 9,609,299 B2 | 3/2017 | Johar |
| 10,609,284 B2 | 3/2020 | Kang et al. |
| 2007/0263096 A1* | 11/2007 | Bouzar ................ H04N 23/682 348/E5.046 |

(Continued)

FOREIGN PATENT DOCUMENTS

| JP | 2014-225846 A | 12/2014 |
| JP | 2021-525043 A | 9/2021 |

(Continued)

OTHER PUBLICATIONS

Extended European search report issued on Jan. 30, 2024, in counterpart European Patent Application No. 23188964.3 (10 pages).

(Continued)

*Primary Examiner* — Gevell V Selby
(74) *Attorney, Agent, or Firm* — NSIP Law

(57) ABSTRACT

A method of generating a hyperlapse video includes: comparing a first reference point of a first image and a corresponding second reference point of a second image; based on the comparing, displaying a first user interface for matching the first reference point and second reference point; and determining whether to perform automatic shooting for the hyperlapse video based on whether the first reference point and the second reference point match.

21 Claims, 14 Drawing Sheets

(56) References Cited

U.S. PATENT DOCUMENTS

| | | | | |
|---|---|---|---|---|
| 2016/0094801 A1* | 3/2016 | Beysserie | ............. | H04N 5/915 |
| | | | | 386/226 |
| 2016/0295129 A1* | 10/2016 | Deshpande | ............ | H04N 5/783 |
| 2017/0359548 A1* | 12/2017 | Joshi | ........................ | H04N 5/77 |

FOREIGN PATENT DOCUMENTS

| KR | 10-2012-0105764 A | 9/2012 |
|---|---|---|
| KR | 10-2013-0114899 A | 10/2013 |
| KR | 10-1797040 B1 | 11/2017 |
| KR | 10-2020-0027276 A | 3/2020 |
| KR | 10-2020-0093760 A | 8/2020 |
| KR | 10-2021-0143345 A | 11/2021 |

OTHER PUBLICATIONS

Korean Office issued on Dec. 20, 2024 in corresponding Korean Patent Application No. 10-2022-0143745. (7 pages in English and 10pages in Korean).

* cited by examiner

METHOD AND APPARATUS WITH HYPERLAPSE VIDEO GENERATION

CROSS-REFERENCE TO RELATED APPLICATIONS

This application claims the benefit under 35 USC § 119(a) of Korean Patent Application No. 10-2022-0143745 filed on Nov. 1, 2022, in the Korean Intellectual Property Office, the entire disclosure of which is incorporated herein by reference for all purposes.

BACKGROUND

1. Field

The following description relates to a method and apparatus with hyperlapse video generation.

2. Description of Related Art

A hyperlapse video is generally a video generated by a shooting technique of a camera capturing images or videos at regular intervals while the camera is moved or moving. A hyperlapse video is a form of time lapse video during which the camera may move rather than stay stationary. Such images or videos can be used to generate a hyperlapse video that can be displayed to provide a visual effect of both time-lapse and movement. For example, for a processor to generate a hyperlapse video, a shooting target, a shooting path, or a fixed point (e.g., an anchor) may be used. In addition, a user may manually move a camera along a path while holding the camera that is capturing hyperlapse video/images. At a position to which the user has moved, the user may adjust (e.g., reorient) the camera to adjust the positioning of the fixed point (or shooting target, shooting path, etc.) on a screen of the camera, for example. The processor may generate a hyperlapse video based on a sequence of images or videos shot over such repeated movements and shootings with respect to the shooting target/path/point.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of generating a hyperlapse video includes: comparing a first reference point of a first image and a corresponding second reference point of a second image; based on the comparing, displaying a first user interface for matching the first reference point and second reference point; and determining whether to perform automatic shooting for the hyperlapse video based on whether the first reference point and the second reference point match.

The method may further include: automatically identifying candidate points in an image; and determining a reference point from among the candidate points based on a user input selecting the reference point.

A candidate point may be identified based on a bounding box of an object detected in the image.

The candidate point may be identified based on being positioned on or within the bounding box.

The second reference point may be identified by tracking a point corresponding to the first reference point in the second image.

The method may further include: displaying the first user interface based on a determination that the first reference point does not match the second reference point; and determining whether a camera is horizontal when the first reference point and the corresponding second reference point match.

The method may further include: based on a determination that the first reference point and the corresponding second reference point do not match, causing the first reference point and the second reference point to match by automatically adjusting a pan, tilt, or zoom of a camera.

The method may further include displaying a second user interface representing horizontal status of a camera, where the displaying the second user interface is based on the comparing.

The method may further include performing the automatic shooting based on the horizontal status of the camera.

The method may further include: performing the automatic shooting responsive to determining that the camera is horizontal; and responsive to determining that the camera is not horizontal, displaying the second user interface.

The method may further include: determining a camera-setting value of a camera in association with the determining of the reference point; and fixing the determined camera-setting value.

The determining the camera-setting value may include determining a frame rate based on the reference point.

The fixing the camera-setting value may include fixing a white balance value or an exposure time of the camera.

The fixing the camera-setting value may include fixing a sensitivity value or an aperture value of the camera.

The automatic shooting may include shooting a sequence of images or video frames without a user input initiating the shooting.

The performing the automatic shooting may include automatically focusing using an autofocus function.

In another general aspect, an electronic device includes: a camera; one or more processors; storage storing instructions configured to, when executed by the one or more processors, cause the one or more processors to: compare a first reference point of a first image and a corresponding second reference point of a second image, based on a result of the comparing, display a first user interface for matching the first reference point and the second reference point, and perform automatic shooting based on whether the first reference point and the second reference point match.

The instructions may be further configured to cause the one or more processors to: determine candidate points in an image; and determine a reference point from among the determined candidate points based on a user selection input.

The instructions may be further configured to cause the one or more processors to: display the first user interface responsive to a determination that the first reference point and the corresponding second reference point do not match.

In another general aspect, there is a method of generating a hyperlapse video in a portable electronic device including a camera and a display, and the method includes: obtaining a first image through the camera when the portable electronic device is at a first position; determining candidate points in the first image; displaying the determined candidate points on the display; determining one of the candidate points to be a first reference point based on a user selection input; and when obtaining a second image through the camera when the portable electronic device is at a second position: determining a second reference point based on a reference object detected in the second image; and performing automatic shooting responsive to determining that the first reference point and the second reference point match.

The method may further include: responsive to determining that the first reference point and the second reference point do not match, displaying a first user interface on the display.

Other features and aspects will be apparent from the following detailed description, the drawings, and the claims.

Figure 1:
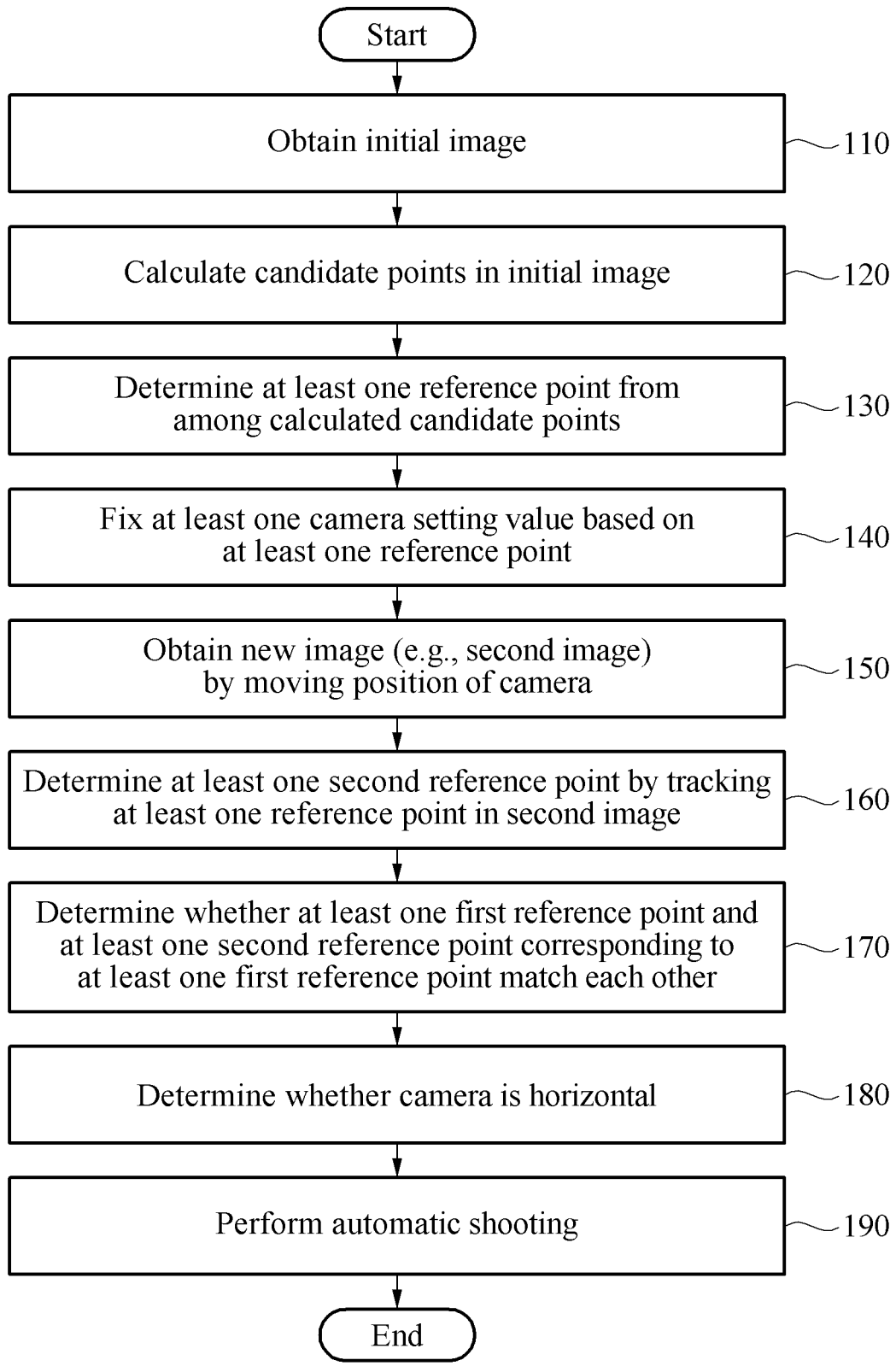
FIG. 1 illustrates an example method of generating a hyperlapse video, according to one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example method of generating a hyperlapse video, according to one or more example embodiments. The method may be referred to as a hyperlapse video generation method.

According to an example embodiment, to generate a hyperlapse video, a method of matching the positions of fixed points may be employed. For example, a method of matching the positions of fixed points is not employed, a subsequent image may be captured under the assumption that it has been captured accurately. Incidentally, the term "capturing an image and/or video" or a "captured image and/or video" may be described herein as "shooting an image and/or video" or a "shot image and/or video." Further regarding the example embodiment, when the positions of the fixed points do not match, stabilization may be performed during or after shooting to generate a video. However, in this case, the generated video may be shaky and unsmooth, and there may be a shooting error that may not be completely removable by a post-capture editing process. Therefore, the quality of a hyperlapse video to be generated may be degraded. For example, when a hyperlapse video is generated with a sequence of videos, screen shaking may be further intensified, which may greatly degrade the quality of the hyperlapse video. For example, when a hyperlapse video is generated with a sequence of images in a fully manual procedure, a user may have to repeatedly touch a shoot button, which may cause camera shaking and increase user fatigue during the image shooting.

According to an example embodiment, to improve the quality of a generated hyperlapse video, a processor (e.g., a processor 1010 in FIG. 10) may determine whether a reference point in a previously shot image (or frame) matches a reference point in a subsequently shot image (or frame). A reference point may be, for example, a point which is a reference for generating a hyperlapse video, and may be, for example, a point within a bounding box of a reference object for generating a hyperlapse video. The reference point may be a point of a fixed physical object or feature, for example. For example, when a hyperlapse video is generated based on a sequence of images, the fixed point may be a point on an object (e.g., in bounding box of the object) that is mostly (or at all times) included in each of the images in the sequence of images used for generating the hyperlapse video. For example, when a hyperlapse video is generated based on a sequence of videos, a fixed point may be a point on an object (e.g., in bounding box of the object) that is mostly (or at all times) included in each of the frames in the videos in the sequence of videos used for generating the hyperlapse video.

According to an example embodiment, when the reference points are determined to match, the processor 1010 may automatically shoot an image or video (for example, without requiring a user to activate or actuate a shoot button or the like). When the reference points do not match, the processor 1010 may defer automatic shooting and instead display a guide (user interface for interactively matching the points. The processor 1010 may also display candidate reference points to increase user convenience. In addition, the processor 1010 may automatically track a point selected by the user from among the candidate points. The processor 1010 may provide the user with an interactive guide (user interface) for matching the reference points (e.g., by providing real-time visual feedback about the position of the camera/device with respect to the reference point and/or the horizon). When the reference points match and the camera being used is horizontal, the processor 1010 may automatically shoot an image or video responsive to determining such condition(s). This may have benefits such as reducing shaking caused by a touch of the user, reducing user fatigue from repeated touches, and shortening shooting time while increasing the quality of the hyperlapse video.

Hereinafter, hyperlapse video generation methods are described in detail. Operations described below with reference to FIG. 1 may be performed in any order. These operations are merely an example, and some of them may be omitted or other operations may be added.

Figure 11:
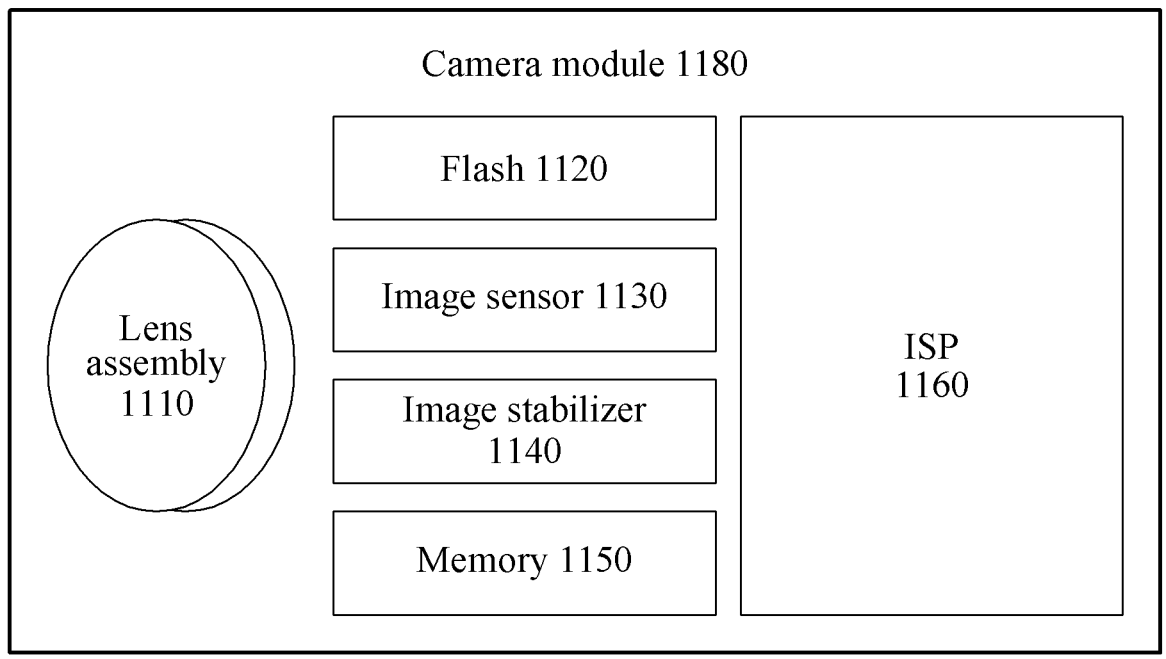
FIG. 11 illustrates an example camera module, according to one or more example embodiments.

According to an example embodiment, in operation 110, the processor 1010 may obtain an initial image, for example by the processor 1010 using or controlling a camera module (e.g., a camera module 1180 of FIG. 11). An "obtained" image described herein may or may not be used to generate a hyperlapse video. In addition, an operation of "shooting" an image described herein may be an operation of using an image obtained using the camera to generate a hyperlapse video. A "shot" image described herein may be an image used to generate a hyperlapse video (although in some cases a shot image may be discarded during post-shoot processing).

Similarly, an operation of "obtaining" a video may be an operation of obtaining, by the processor 1010, from the camera module 1180, a sequence of frames included in a video. An "obtained" frame described herein may or may not be used to generate a hyperlapse video. In addition, an operation of "shooting" a video described herein may be an operation of using a frame obtained using the camera to generate a hyperlapse video. A "shot" frame described herein may be an image used to generate a hyperlapse video (again, some frames might be discarded in post-processing).

The initial image mentioned above may be used to determine a reference point for generating a hyperlapse video. As noted, a sequence of images or videos may be used to generate a hyperlapse video. In the case of generating a hyperlapse video from a sequence of images, the initial image may be an image obtained first among the sequence of images. In a case of generating a hyperlapse video from a sequence of videos, the initial image may be a frame included in a first video. The processor 1010 may track the reference point determined in the initial image/frame through images/frames obtained subsequent to the initial image/frame, by iterating over the obtained images/frames and determining whether a reference point in a previous image/frame matches a reference point in a current image/frame.

In operation 120, the processor 1010 may identify candidate points in the initial image. The processor 1010 may identify the candidate points to display various points that may be selected by a user to become the reference point of the current image/frame. Hereafter, "image" will refer to both an image of an obtained sequence of images and a frame of an obtained video.

In operation 130, the processor 1010 may determine a reference point from among the identified candidate points based on a user selection input (an input made by the user to select a reference point). Note that although a single reference point is mostly described herein, there are also cases (described below) where more than one reference point may be used. The user-selected reference point may be used for generating a hyperlapse video. In another example, the user may select two or more reference points. In this example, the selected reference points may be in the same bounding box.

The processor 1010 may perform object detection in an image and thereby generate bounding boxes. A candidate point may be determined for each respective bounding box. For example, object detection may be performed using a neural network. As a result of object detection, the processor 1010 may generate bounding boxes of respectively detected objects. For a given bounding box, the processor 1010 may select any point on or within the given bound box as a candidate point for the given bounding box. For example, the processor 1010 may select a feature point of the object corresponding to the bounding box to be the candidate point (for example, a feature with a strongest prediction value or image characteristic, etc.). For another example, the processor 1010 may determine a center of a line of the bounding box (or a center of the bounding box) to be the candidate point. The position of the candidate point in the bounding box described above is provided merely as an example, and examples are not limited thereto. The bounding box is described with reference to FIG. 6A. Moreover, in some cases a bounding box may not completely encompass a corresponding detected object and a point of the object outside of the bounding box may be selected. In other cases, object detection may provide object outlines rather than bounding boxes; description of bounding boxes is equally applicable to any delineation of a detected object.

Operations 120 and 130 are described in greater detail with reference to FIG. 2.

In operation 140, the processor 1010 may fix a camera-setting value based on the at least one reference point (more than one camera-setting value may be fixed). The processor 1010 may determine a camera-setting value based on or associated with the determined reference point. Fixing a camera-setting value may be done in any way that maintains the camera-setting value as an active setting being used by the camera while obtaining images or videos.

Figure 3:
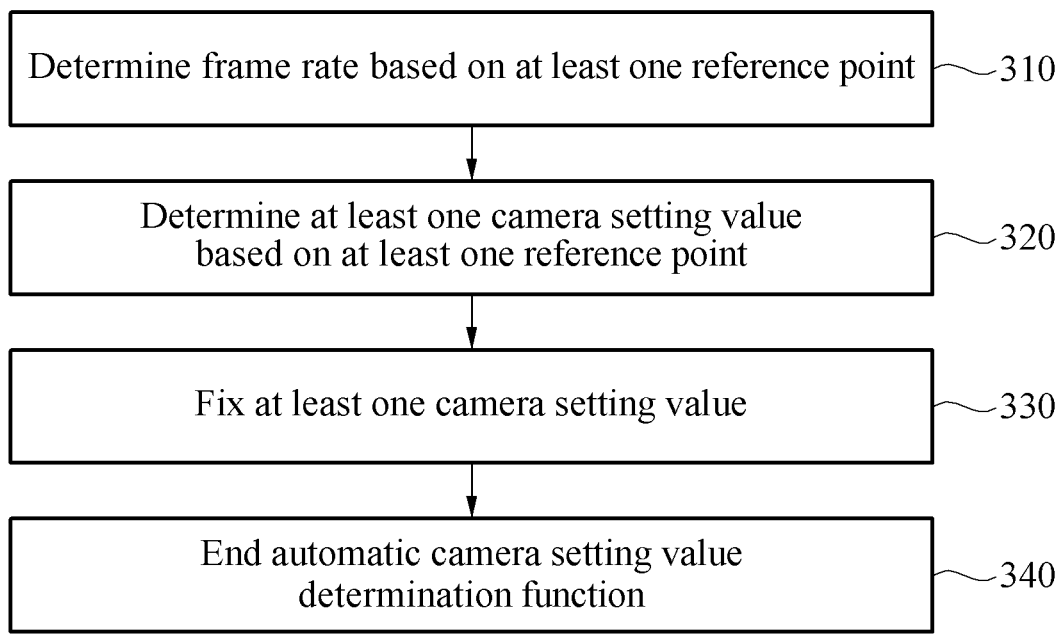
FIG. 3 illustrates an example method of fixing a camera-setting value, according to one or more example embodiments.

Further concerning camera-settings, referring to FIG. 3, in operation 310, the processor 1010 may determine a frame display rate based on or associated with a reference point (e.g., a frame capture rate in effect or associated with the frame, e.g., a rate at which the frame is captured). In operation 320, the processor 1010 may also determine a camera-setting value based on the reference point. The camera-setting value may be a value of items of camera-setting. The items of the camera-settings may each be a setting item used to obtain an image through control of a hardware and/or software configuration of a camera. The items of the camera-settings may include a frame rate, a white balance, an exposure time, a sensitivity (according to the International Standard Organization (ISO)), and/or an aperture, to name some examples.

According to an example embodiment, the processor 1010 may fix the camera-setting value. For example, when shooting a sequence of images or videos, which may serve as a basis of (or be) a generated hyperlapse video, the camera-setting value may need to be fixed to reduce the occurrences of an image-quality discontinuity (e.g., a sudden change in white balance) or artifacts in the hyperlapse video, e.g., shake. When the images or videos obtained during shooting change as the camera-setting value changes during shooting, the quality of the hyperlapse video may be degraded. Accordingly, the processor 1010 may fix the camera-setting value based on or associated with the reference point determined in the initial image, for example.

According to an example embodiment, the processor 1010 may fix a white balance value and/or an exposure time of the camera. For example, the processor 1010 may shoot a sequence of images or videos after fixing the white balance value and/or the exposure time that is determined based on the at least one reference point in the initial image. Note that the camera-setting value may also be obtained just before the initial image is captured. Moreover, a previously acquired camera-setting value may be instated just before shooting begins. Of note will be the maintenance of a camera-setting value (that affects images being captured) to which hyperlapse videos might be sensitive, regardless of how the camera-setting value is determined or maintained.

According to an example embodiment, the processor 1010 may fix a sensitivity value and/or an aperture value of the camera. For example, the processor 1010 may shoot a sequence of images or videos after fixing the sensitivity value or the aperture value determined based on the point in the initial image, for example. Regarding the basis on the point, in some cases the camera setting might vary over different portions of an image. However, generally, the fixed camera-setting value may or may not be based on the point itself, i.e., the "based on the point" may be based on the initial image in general or a camera condition associated therewith.

According to an example embodiment, the processor 1010 may fix a white balance value, an exposure time, a sensitivity value, and/or an aperture value. For example, the processor 1010 may shoot a sequence of images or videos after fixing the white balance value, the exposure time, the sensitivity value, and/or the aperture value determined based on the reference point in the initial image.

In operation 340, the processor 1010 may also fix a camera-setting value by suspending (or stopping) an automatic camera-setting adjusting function. The automatic camera-setting adjusting function may automatically change the value of a camera-setting according to a shooting environment each time an image or video is shot (e.g., light conditions). When the automatic camera-setting adjusting function is in effect, a sequence of images or videos to be included in a hyperlapse video may be shot with different camera-setting values, respectively, due to adjustment thereby. Accordingly, for smooth reproduction of a hyperlapse video, the automatic camera-setting determination function may be paused, deactivated, etc. The camera-setting value feature and the camera-setting adjustment function control are not necessary; changes in a camera-setting may be acceptable, shooting conditions may be stable and obviate the adjusting, etc.

In operation 150, the processor 1010 may obtain a new image (e.g., a second image). As described below, a first image may be an image (or frame) that was previously shot, and a second image may be an image (or frame) that is newly shot in operation 150. The processor 1010 may obtain the newly shot image (or frame) from a camera module. For example, when a sequence of images is shot to generate a hyperlapse video, a time sequence may exist in each of the shot images, and the terms "first image" and "second image" are used herein to indicate a relative chronological relationship between arbitrary images.

At times, the processor 1010 may obtain from the camera module the second image shot at a position or pose different from a position or pose at which the first image was shot. At other times, the processor 1010 may obtain from the camera module the second image shot at the same position or pose at which the first image is shot.

To begin reference-point tracking, the processor 1010 may identify the position (e.g., within the first image) of a first reference point of the first image. For example, for tracking the reference point determined in the initial image, the processor 1010 may identify the position of the first reference point of the first image. The first reference point may be in the first image, and the second reference point may be in the second image.

In operation 160, the processor 1010 may determine a second reference point by performing tracking with respect to the point in the second image. Through this, the processor 1010 may identify the position of the second reference point in the second image.

According to an example embodiment, the processor 1010 may compare a first reference point of a first image and a corresponding second reference point of a second image. The second reference point may be a point identified by the processor 1010 by tracking, in the second image, a point corresponding to the first reference point. For example, when there is one first reference point, one second reference point corresponding to the first reference point may be identified in the second image through point tracking (known point tracking techniques may be used, e.g. based on feature-point extraction, repetitive object detection, continuing delta analysis, etc.). In another example, there may be two second reference points. In this example, the two second reference points respectively corresponding to two first reference points may be identified in the second image through point tracking. Accordingly, the processor 1010 may compare, to the first reference point, the corresponding second reference point.

In operation 170, the processor 1010 may determine whether the first reference point and the corresponding second reference point match. Operation 170 is described with reference to FIG. 4.

In operation 180, the processor 1010 may determine whether the camera is sufficiently horizontal. The processor 1010 may determine whether the camera is sufficiently horizontal based on a sensed horizontal axis of the camera and a threshold angle. When a hyperlapse video is generated by shooting an image or video while the camera is not sufficiently horizontal, shaking or disconnected scenes may be shown in the hyperlapse video. Operation 180 is described with reference to FIG. 5.

According to an example embodiment, the processor 1010 may display, e.g., on a display screen, a second guide for helping a user to maintain the camera horizontally based on a comparison between the first reference point and the corresponding second reference point. The second guide is described with reference to FIG. 8. In some implementations, when the camera is sufficiently horizontally maintained the processor 1010 may perform automatic shooting (e.g., automatic shooting may commence upon determining that the camera is horizontal). When the camera is not sufficiently horizontally maintained the processor 1010 may display the second guide on the screen and, in some implementations, may pause automatic shooting until a horizontal sufficiency is attained.

In operation 190, the processor 1010 may perform automatic shooting. Automatic shooting described herein may be to shoot (or capture) a sequence of images or videos responsive to a condition (e.g., point matching and/or horizontal alignment) and independent of a user input associated with the shooting. Ordinarily, to shoot an image or video, the processor 1010 may need to receive a screen touch signal or a button input signal. In contrast, the automatic shooting of operation 190 may shoot an image or video even without the user shooting-control input.

According to an example embodiment, the automatic shooting may be performed when (responsive to) a condition of matching reference points and/or a condition of horizontally maintaining the camera is/are satisfied.

According to an example embodiment, in a case of generating a hyperlapse video with a sequence of shot videos, the processor 1010 may automatically shoot the videos for a predetermined period of time. For example, when the condition of matching reference points and/or the condition of horizontally maintaining the camera is/are satisfied, the processor 1010 may automatically shoot the videos for two minutes.

According to an example embodiment, in a case of generating a hyperlapse video with a sequence of shot images, the processor 1010 may automatically shoot an image (or more). For example, when the condition of matching points and/or the condition of horizontally maintaining the camera is/are satisfied, the processor 1010 may automatically shoot two hundred images.

According to an example embodiment, the processor 1010 may perform the automatic shooting after automatically focusing by using an autofocus function. The autofocus function may be a function by which the processor 1010, for example, automatically focuses on a subject. Thus, the autofocus function may be automatically executed each time the automatic shooting is performed.

According to an example embodiment, after the automatic shooting is finished, the processor 1010 may again perform operation 150. To generate a hyperlapse video, the user may shoot an image or video at a new location. In this case, the processor 1010 may obtain a new image (e.g., the second image) from the camera module. Also, in a case of shooting a video, the processor 1010 may obtain a new frame (e.g., the second image) from the camera module. The processor 1010 may perform operations 160 to 190 again by comparing the newly shot second image to a previous image.

Whether to end at or after the operation 190 may be determined based on a user selection input or a predetermined condition. For example, when the user presses an end button, the automatic shooting may be ended. When the predetermined condition is a number of images to be shot, the automatic shooting may be ended when the number of images have been shot. For example, under the condition of shooting two hundred images, the automatic shooting may be ended when all the two hundred images are shot. For another example, under the condition of shooting a 2-minute video, the automatic shooting may be ended after the video is shot for two minutes.

In some embodiments, operation 180 may be omitted and when the reference point matching condition is satisfied the processor 1010 performs the automatic shooting. The processor 1010 may perform the automatic shooting after automatic horizontalization. In this case, the second guide may not be displayed on the screen.

Hyperlapse video generation methods described herein may readily generate high-quality hyperlapse videos. A guide may be provided on the screen to facilitate a process of horizontally maintaining the camera and matching reference points, and an image or video to be automatically shot when the camera is horizontally maintained and/or reference points are matched. Shaking that may occur when the user touches a shoot button may be reduced. Thus, an image or video with reduced shaking may be shot, and the processor 1010 may enhance the quality of a hyperlapse video to be generated therefrom.

The hyperlapse video generation methods may be performed by a portable electronic device. The portable electronic device may obtain a first image through a camera included in the portable electronic device at a first position or pose of the portable electronic device. The processor 1010 included in the portable electronic device may obtain the first image from a camera module including the camera. The portable electronic device may compute candidate points in the first image. The portable electronic device may display the candidate points on a display of the portable electronic device. The portable electronic device may determine a first reference point from among the candidate points based on a user selection input.

For example, when the portable electronic device obtains a second image through the camera at a second position or pose, the following operations may be performed. The operations may include operation (a) and operation (b). Operation (a) determines a second reference point in a bounding box of a reference object in the second image when the portable electronic device obtains the second image through the camera at the second position. The reference object may be an object included in all images used to generate a hyperlapse video. The operation (b) performs automatic shooting through the camera when the first reference point and the second reference point match (e.g., in response to a determination that they match). When the first reference point and the second reference point do not match, the portable electronic device may display the first guide on the display. The portable electronic device may perform operation (a) or operation (b) each time it obtains a new image through the camera at a new position.

According to an example embodiment, the hyperlapse video generation methods may allow an inexperienced user to readily shoot a high quality hyperlapse video by presenting a candidate point (e.g., a candidate fixed point). Thus, the hyperlapse video generation method may help lower the barrier to shooting a hyperlapse video for various users and increase the number of such users.

The hyperlapse video generation methods may reduce fatigue by reducing tasks a user would otherwise need to repeatedly perform to generate a hyperlapse video using an image. For example, when generating a hyperlapse video with one hundred frames (corresponding to 4 seconds of hyperlapse video), the user may need to press a button twice (e.g., autofocus and shoot buttons) for each image, and may thus need to perform at least two hundred or more touches (or inputs) when the touches (or inputs) include a touch/input for initial settings (before each photo is shot). In contrast, the hyperlapse video generation methods may reduce the user's inputs to three—an input to start shooting, an input to select a reference point, and an input to end (in some cases the shooting process may be controlled by the user changing the orientation of the camera/device).

According to an example embodiment, the hyperlapse video generation method may also increase an effective frame rate of a video when generating a hyperlapse video with a sequence of videos. For example, when shooting a video, a method of shooting frames at regular intervals and a method of selecting a frame during or after the shooting may not include a process of matching reference points, and the video may thus be shaky. In addition, there may be no desired frame or image in a process of selecting frames, and the quality of a hyperlapse video to be generated may thus be degraded (e.g., by skipped frames). In contrast, hyperlapse video generation methods described herein may perform automatic shooting when reference points match and the horizon is maintained, and a desired frame or image may thus be obtained with a high probability. In addition, the hyperlapse video generation method may minimize loss (e.g., omitted frames) that may occur in a post-processing process. When a shaking image is shot and corrected during post-processing, there may inevitably be an area of frame that is lost. For example, 64% of the entire frame area may be lost in post-processing.

Figure 2:
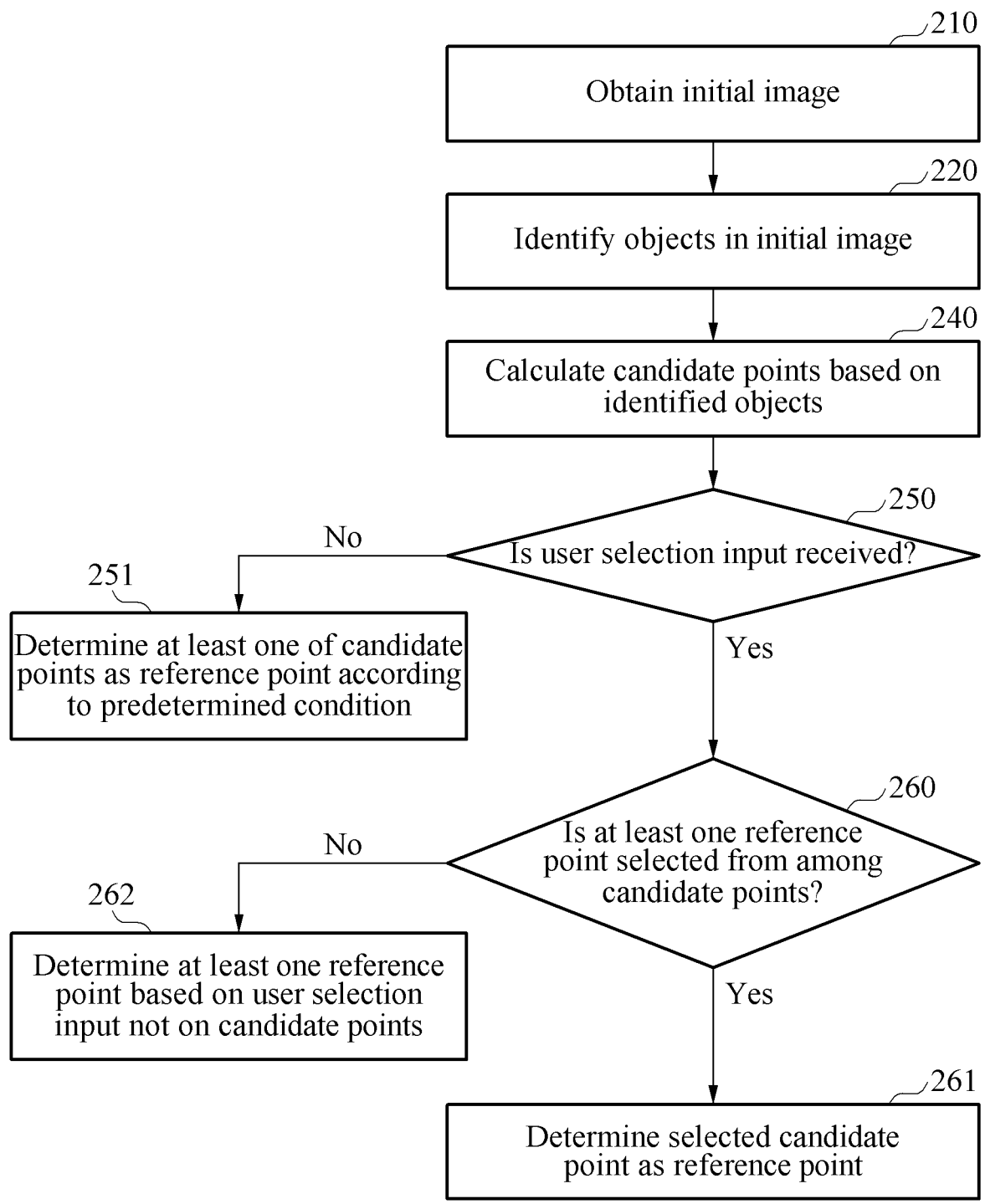
FIG. 2 illustrates an example method of determining a reference point from among candidate points, according to one or more example embodiments.

FIG. 2 illustrates an example method of determining a reference point from among candidate points, according to one or more example embodiments.

In operation 210, the processor 1010 may obtain an initial image.

In operation 220, the processor 1010 may identify objects in the initial image, for example, using any object detection algorithm, a neural network trained for object detection, etc. A method of identifying objects in an image may be performed based on object detection as described with reference to FIG. 1.

In operation 240, the processor 1010 may calculate candidate points based on the identified objects. The object detection may generate bounding boxes for each of the objects. The processor 1010 may calculate the candidate points based on each of bounding boxes. For example, a candidate point may be on a line of a bounding box or inside the bounding box.

As a result of operation 240, the processor 1010 may display, on the screen, the candidate points calculated from the image. The user may then select a reference point from among the plurality of candidate points displayed on the screen (in some embodiments, more than one reference point may be selected). In operation 250, the processor 1010 may receive a user selection input for that purpose. The input may be, for example, a touch on a display of the image with touch-responsive representations of the candidate points.

In operation 260, there is a user selection input selecting the reference point from among the candidate points. The processor 1010 may receive an input selecting one reference point or an input selecting multiple reference points (although selection of a single reference point is mainly described, the same description applies to selection of multiple reference points).

In operation 261, when receiving the user selection input, the processor 1010 may determine or set the selected candidate point as the reference point In some implementations, the user may select a reference point other than one of the candidate points. In operation 262, the processor 1010 may determine the reference point based on a user selection input rather than the plurality of candidate points. In this case, the processor 1010 may receive the user selection input and receive a position (e.g., coordinates) of the reference point selected by the user. The processor 1010 may determine the reference point based on the position of the received reference point (e.g., a touch input position).

In some cases there may be no user selection input in operation 250, and the processor 1010 may determine a reference point from among the candidate points according to a predetermined condition. The predetermined condition may be a condition of a candidate point having a high probability of being determined as the reference point. For example, the predetermined condition may be that a candidate point is closer (or closest) to the center of the screen. Or, the processor 1010 may determine a candidate point positioned at the center of the screen as the reference point (the center point may be included as a candidate point independent of object detection, i.e., the center point candidate may be included as a candidate point without being associated with a detected object). Accordingly, when there is no user selection input, the processor 1010 may automatically determine the reference point based on the predetermined condition.

When a reference point has been determined as described above, the processor 1010 may perform operation 140.

FIG. 3 illustrates an example method of fixing a camera-setting value, according to one or more example embodiments.

Operations 310 to 340 illustrated in FIG. 3 may be performed in any practical order. The operations illustrated in FIG. 3 are an example; some may be omitted or others may be added. Detailed description of the operations in FIG. 3 is provided above with reference to FIG.

Figure 4:
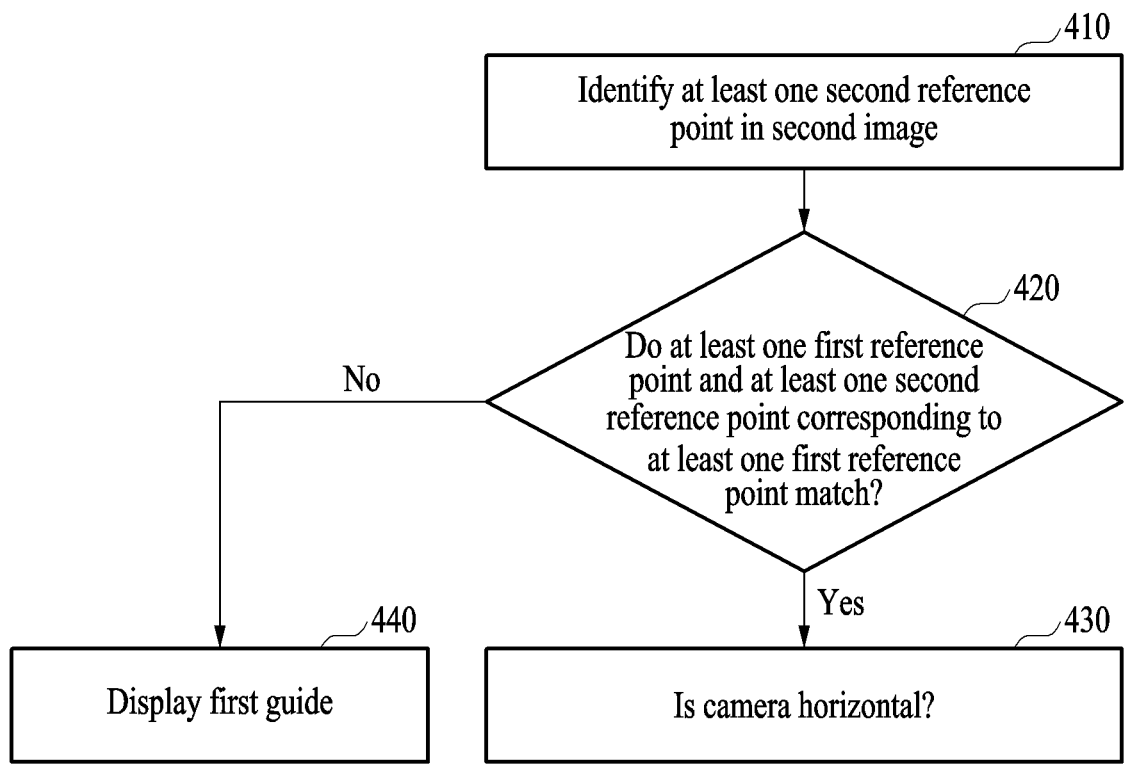
FIG. 4 illustrates an example method of using point tracking to determine whether a position of a first reference point matches a position of a second reference point, according to one or more example embodiments.

FIG. 4 illustrates an example method of determining whether a position of a first reference point and a position of a second reference point match based on point tracking, according to one or more example embodiments.

In operation 410, the processor 1010 may identify a second reference point in a second image.

In operation 420, the processor 1010 may determine whether the first reference point and the corresponding second reference point match. The processor 1010 may determine whether a position of the first reference point matches a position of the second reference point. In some implementations, the position matching may involve determining if the positions are sufficiently close in terms of their positions within their respective images. However, matching as used herein is not so constrained. Matching may take into account other information. For example, if scene modeling/reconstruction is used, a transform may be applied to the second reference point before comparing it to the first reference point. Matching may be based on any condition that results in an adequate hyperlapse video.

In operation 440, when the first reference point and the corresponding second reference point do not match, the processor 1010 may display a first guide (user interface) on a screen.

In operation 430, when the first reference point and the corresponding second reference point match, the processor 1010 may determine whether the camera is horizontally maintained.

To summarize, when there is one reference point, the processor 1010 may determine whether the first reference point and the second reference point match. When the first reference point and the second reference point match, in operation 430 the processor 1010 may determine whether the camera is horizontal. In contrast, when the first reference point and the second reference point do not match, the processor 1010 may display the first guide on the screen in operation 440. The first guide is described with reference to FIG. 7B.

When there are multiple first reference points, the processor 1010 may determine whether each of the first reference points matches a respectively corresponding second reference point. When each of the first reference points matches a respectively corresponding second reference point, in operation 430 the processor 1010 may determine whether the camera is horizontal. In contrast, when any of the first reference points do not match a second reference point, the processor 1010 may display the first guide for the non-matching second reference points, in operation 440. In some implementations, when there is a large number of reference points, even if some of the reference points do not match, the processor 1010 may proceed to operation 430 without displaying the first guide, because manually matching a large number of reference points may be impractical.

Figure 5:
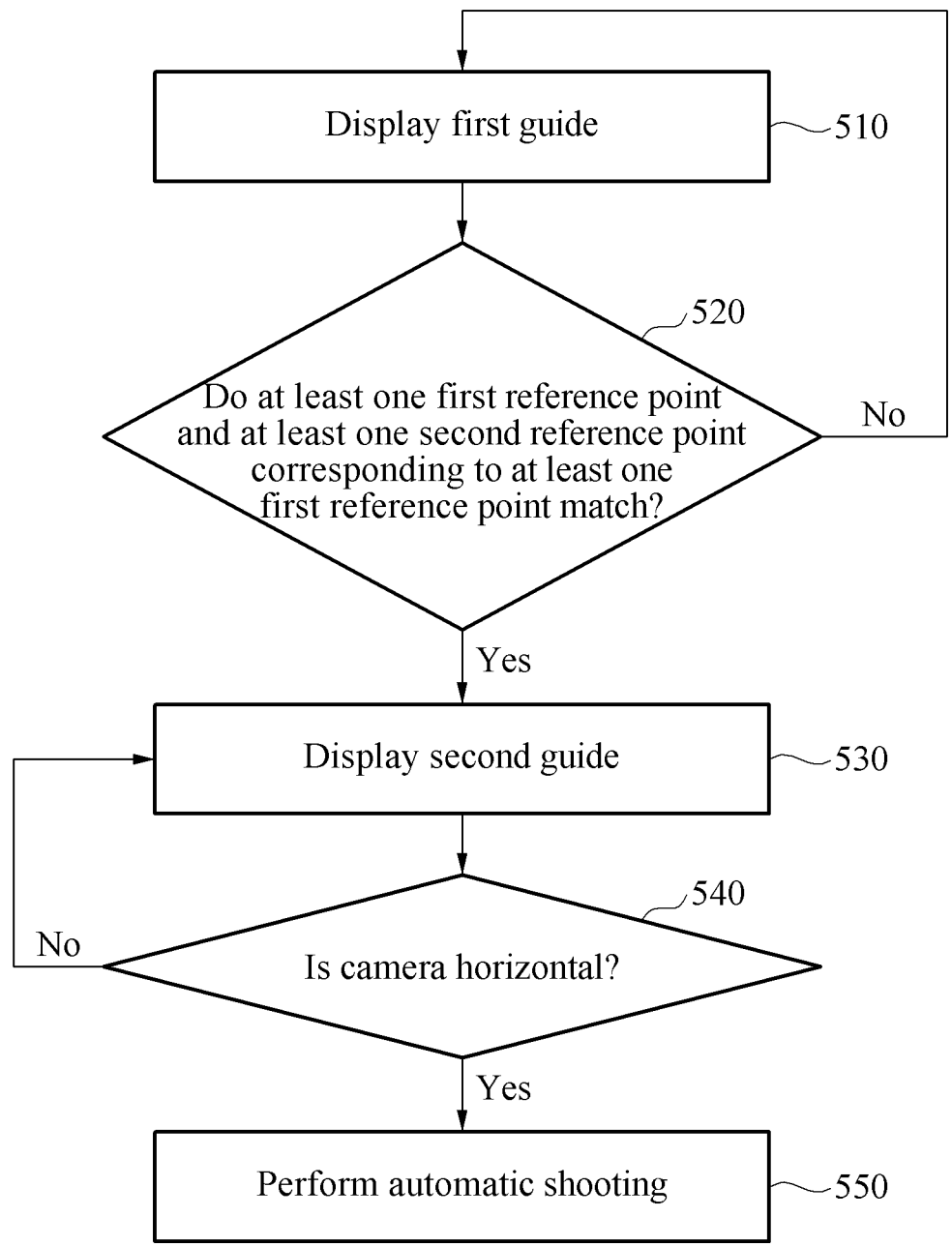
FIG. 5 illustrates an example method of displaying a first guide and a second guide, according to one or more example embodiments.

FIG. 5 illustrates an example method of providing a first guide and a second guide, according to one or more example embodiments.

In operation 510, when a first reference point and a corresponding second reference point do not match, the processor 1010 may display a first guide, as described with reference to FIG. 4.

In operation 520, the processor 1010 may again determine whether a first reference point and a corresponding second reference point match.

When the first reference point and the corresponding second reference point do not match, the processor 1010 may perform operation 510, namely, again displaying the first guide on the screen. In this way, the processor 1010 may continue displaying the first guide on the screen until a first and second reference point match. In addition, a user may change the position or shooting angle of the camera by viewing the first guide to interactively match a reference point. The first guide may be updated each time, e.g., to reflect changed positions of the second reference point.

In operation 530, when the first reference point and the corresponding second reference point match, the processor 1010 may display a second guide. In operation 540, the processor 1010 may determine whether the camera is maintained horizontally. Although FIG. 5 shows operation 530 occurring before operation 540, operation 530 may be skipped for the first iteration of operations 530 and 540; i.e., the second guide may not be displayed at all if the camera is already horizontal when operation 520 completes with a "Yes". When the camera is not maintained horizontally, the processor 1010 may perform operation 530. In this way, the processor 1010 may continue displaying the second guide on the screen until the camera is maintained horizontally. That the camera is maintained horizontally may indicate that the horizon in a first image and the horizon in a second image match. Determining whether the camera is horizontal may include some tolerance. For example, operation 540 may determine that the camera is horizontal when a difference between a tilt of the camera and the horizon is less than an angular threshold. Similarly, comparing reference point positions may also include a tolerance in the form of a threshold distance between corresponding first and second reference points.

The processor 1010 may perform automatic shooting based on whether the camera is maintained horizontally. In operation 550, when the camera is maintained horizontally, the processor 1010 may perform automatic shooting. That is, shooting may start responsive to determining that the camera is horizontal.

Figure 6A:
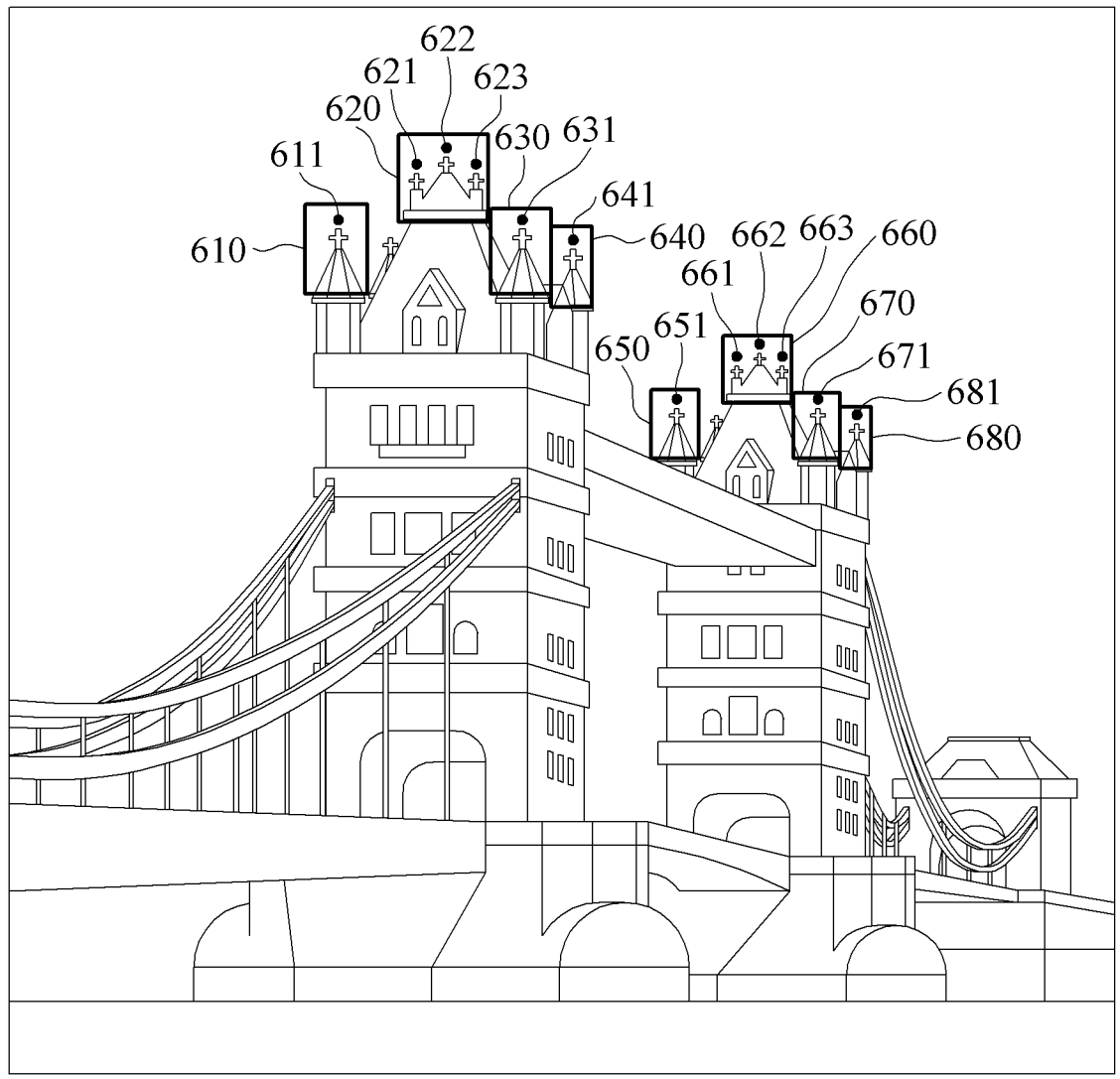
FIGS. 6A through 6C illustrate an example of identifying candidate points and selecting a reference point from among the candidate points, according to one or more example embodiments.
Figure 6B:
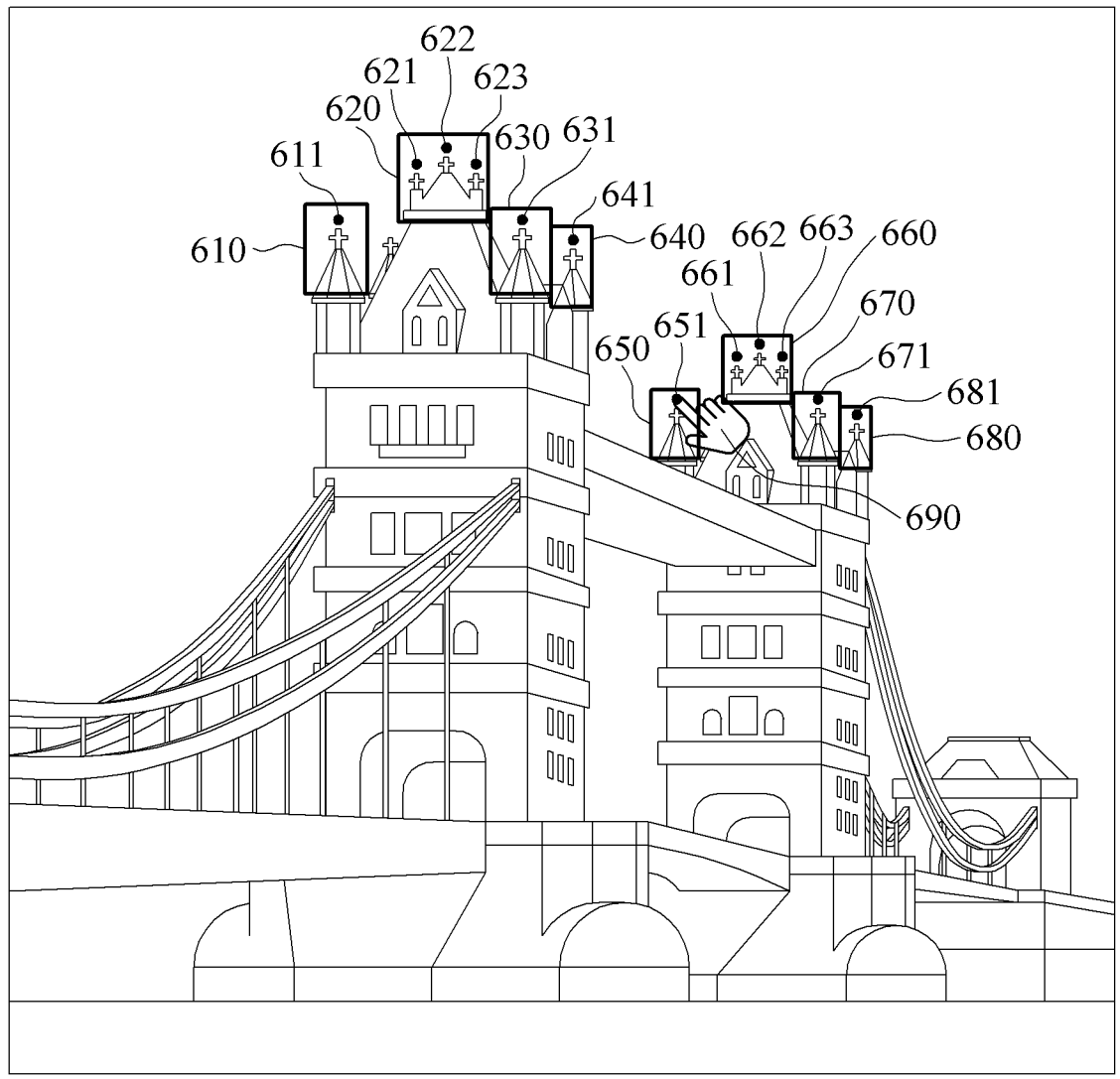
Figure 6C:
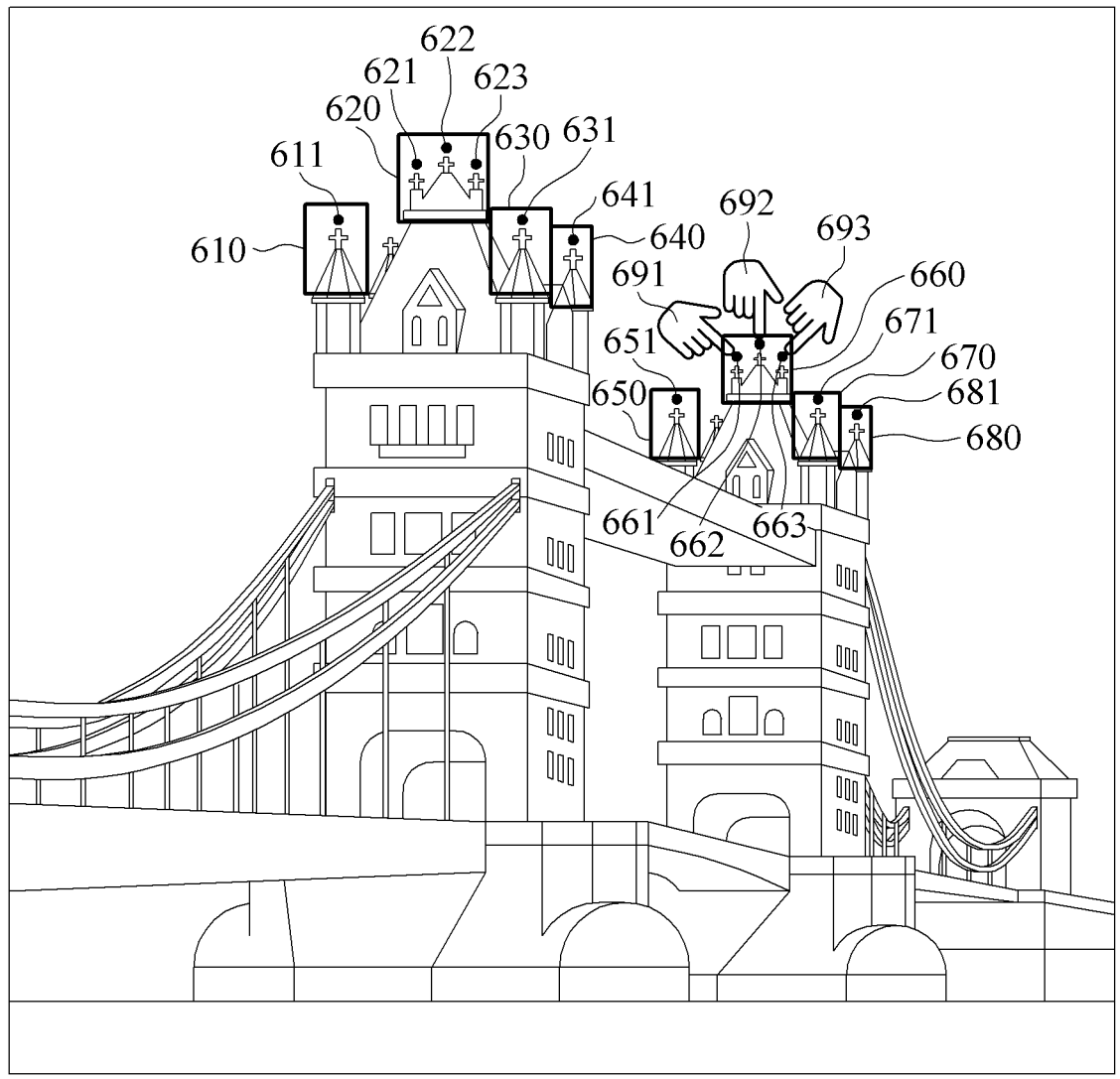

FIGS. 6A through 6C illustrate an example of identifying candidate points and selecting a reference point from among the candidate points, according to one or more example embodiments.

FIGS. 6A to 6C show bounding boxes 610-680 and candidate points 611-681 in an initial image.

FIG. 6A illustrates an example result of identifying candidate points, for example in an initial image. A candidate point may be selected to become a reference point.

Candidate points may be on or within a bounding box. For example, as illustrated, the candidate point 651 may be positioned on an upper outer line of the bounding box 650, and the candidate points 621 and 623 may be positioned inside the bounding box 620.

Multiple candidate points may be in one bounding box. As illustrated, the candidate points 661, 662, and 663 may be in the bounding box 660. The multiple candidate points may be detected feature points in the one bounding box. As illustrated in FIG. 6A, a feature point may correspond to a cross positioned at the end of a spire. In addition, multiple crosses (corresponding to feature points) may be present inside the one bounding box. In this case, the candidate points 661, 662, and 663 may correspond to the bounding box 660.

FIG. 6B illustrates an example case in which one reference point is selected. For example, the processor 1010 may receive a user selection input 690 from a user selecting the candidate point 651. In this example, the processor 1010 may determine the candidate point 651 to be the one reference point.

FIG. 6C illustrates an example case in which multiple reference points are selected. The processor 1010 may receive user selection inputs 691, 692, and 693 from a user selecting three candidate points positioned in the same bounding box. A user interface may be displayed (e.g., on a display of a portable device, camera, etc.) that somewhat corresponds to FIG. 6, i.e., the user interface may include the relevant image (e.g., an initial image) overlaid by user-selectable graphic indications of the candidate points. The user may select (e.g., through touch inputs, through a multi-direction button, etc.) the candidate points 661, 662, and 663 positioned in the same bounding box 660. The processor 1010 may determine the selected candidate points 661, 662, and 663 to be the reference points.

When the number of reference points increases, image shaking may be further reduced. However, reference points are far apart from each other, it may be difficult to match all of the reference points when shooting images or videos at different locations (e.g., due to parallax). In some implementations, the determination of whether reference points match (for controlling automatic shooting or displaying a guide) may be based on whether reference points positioned inside one bounding box match. In this case, it may be easier for a user to match a plurality of points even when shooting images or videos at another location while still reducing image shake.

Figure 7A:
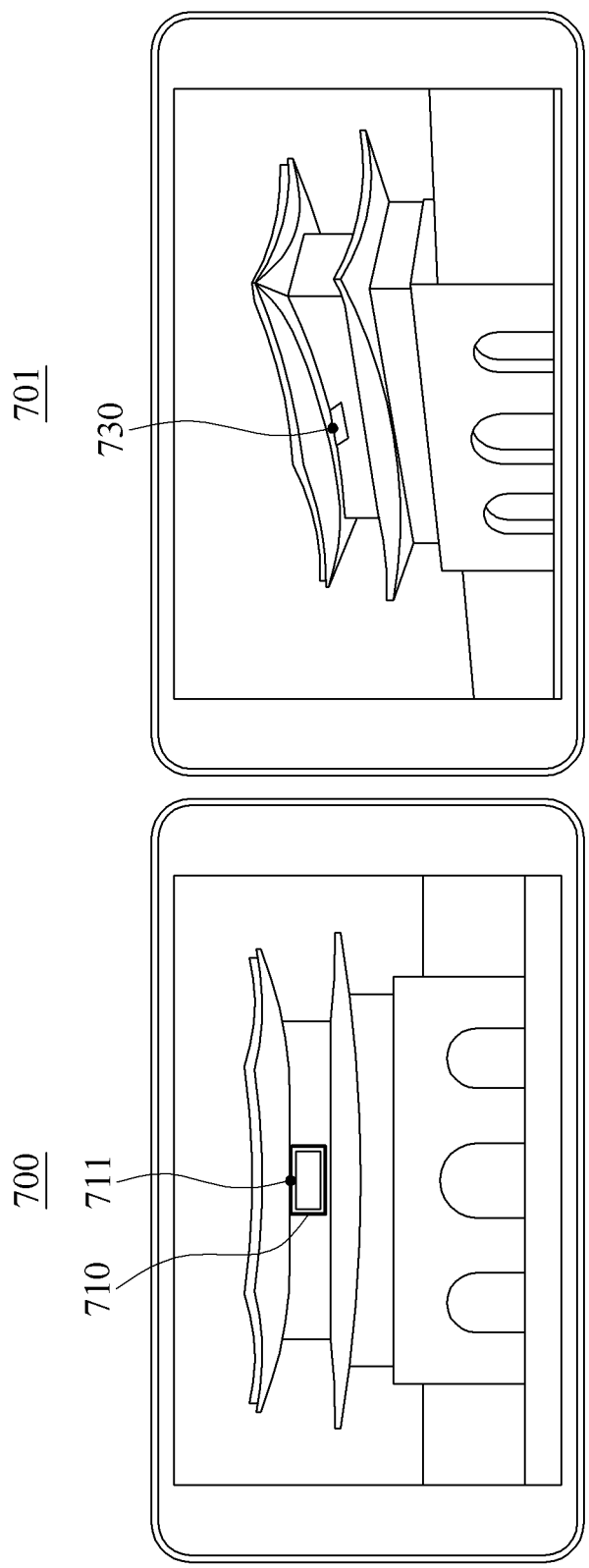
FIGS. 7A and 7B illustrate an example case in which a first reference point and a second reference point do not match, according to one or more example embodiments.
Figure 7B:
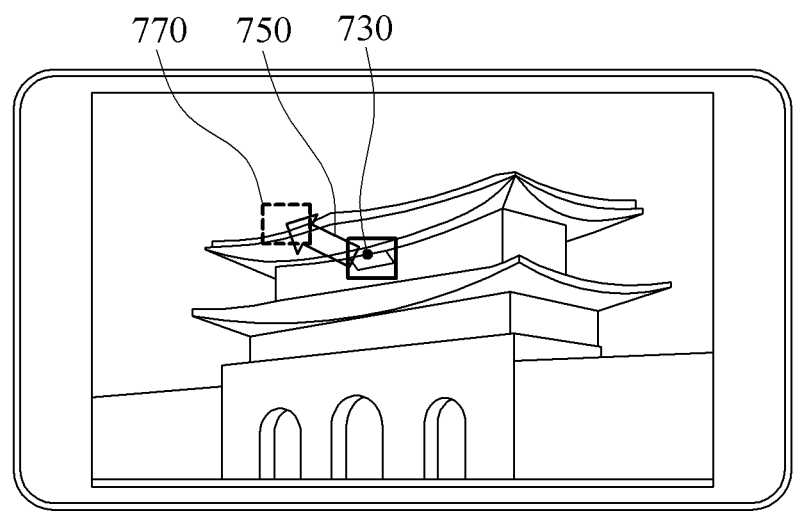

FIGS. 7A and 7B illustrate an example case in which a first reference point and a second reference point do not match, according to one or more example embodiments.

A first image 700 and a second image 701 are illustrated in FIG. 7A. On the first image 700, a first reference point 711 is displayed and a bounding box 710 is also displayed. For example, the first image 700 may be obtained by shooting an image of a palace in front of an entrance of the palace. The second image 701 may be obtained by shooting an image of the palace from the side of the entrance of the palace after changing the position of the camera. When the position of the camera is changed, a reference point may be identified in the second image 701 based on point tracking. For example, a second reference point 730 may be identified in the second image 701.

The processor 1010 may determine whether the first reference point 711 and the second reference point 730 match. When the first reference point 711 and the second reference point 730 match, the processor 1010 may determine whether the camera is maintained horizontally.

An example in which the first reference point 711 and the second reference point 730 do not match is now described with reference to FIG. 7B. When the first reference point 711 and the second reference point 730 do not match, the processor 1010 may display a first guide 750 on the screen (i.e., a first user interface). For example, when the second reference point 730 is required to move to a target position 770 for matching, the processor 1010 may display the first guide 750. In this example, a user may change the position of the camera to move the second reference point 730 to the target position 770 while viewing the first guide 750. The user may readily match the reference points through the first guide 750 and may thus obtain an image or video that avoids shake. The first guide may be implemented in numerous ways. The example of FIG. 7B is a simple arrow. In another example, the first guide may be a representation of the target position 770 (e.g. a point graphic or a bounding box graphic). The first guide may include graphics that are generated based on the first point, the second, point, and/or a difference between the points. The first guide may be a user interface that is generated based on the first reference point and may possibly also be generated based on the second reference point. In some implementations, the first guide may be an interactive "live view" user interface where a new second image is repeatedly captured and displayed and the second reference is repeatedly identified therein, thus providing feedback to the user as they adjust the camera until a new second image has a matching second reference point.

Figure 8:
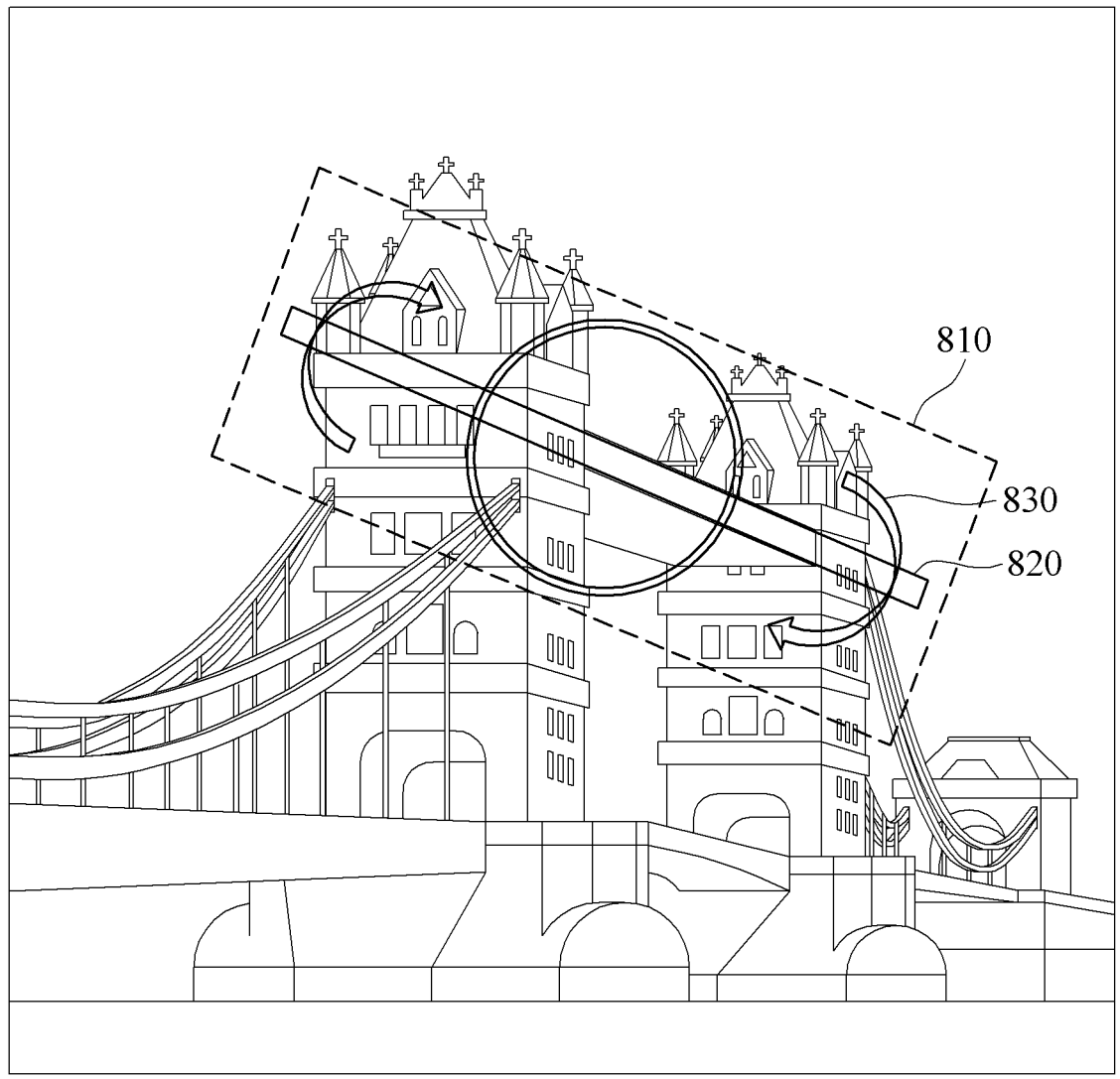
FIG. 8 illustrates an example of displaying a second guide, according to one or more example embodiments.

FIG. 8 illustrates an example of displaying a second guide on a screen, according to one or more example embodiments.

FIG. 8 illustrates a second guide 810 (i.e., a second user interface). The second guide 810 may include a horizontal axis indicator 820 of a camera and a rotation direction indicator 830. The horizontal axis indicator 820 may be a reference line graphic indicating a current horizontal rotation of the camera based on sensor information. The rotation direction indicator 830 may indicate the direction and/or degree that the camera is required to rotate to maintain the camera to be horizontal. That is, the rotation direction indicator 830 may indicate, and be based on, a direction (and possibly also degree) of difference between the current horizontal rotation of the camera and the horizon. For example, the larger the degree of horizontal rotation, the larger the rotation direction indicator 830 may be. A user may then adjust the camera to be horizontal while referring to the second guide 810 displayed on the screen. The second guide 810 may be interactive. For example, the displayed image may be a live view of the camera and the horizontal axis indicator 820 and the rotation direction indicator may be repeatedly updated to reflect the current horizontal rotation of the camera as it is adjusted by the user.

Figure 9:
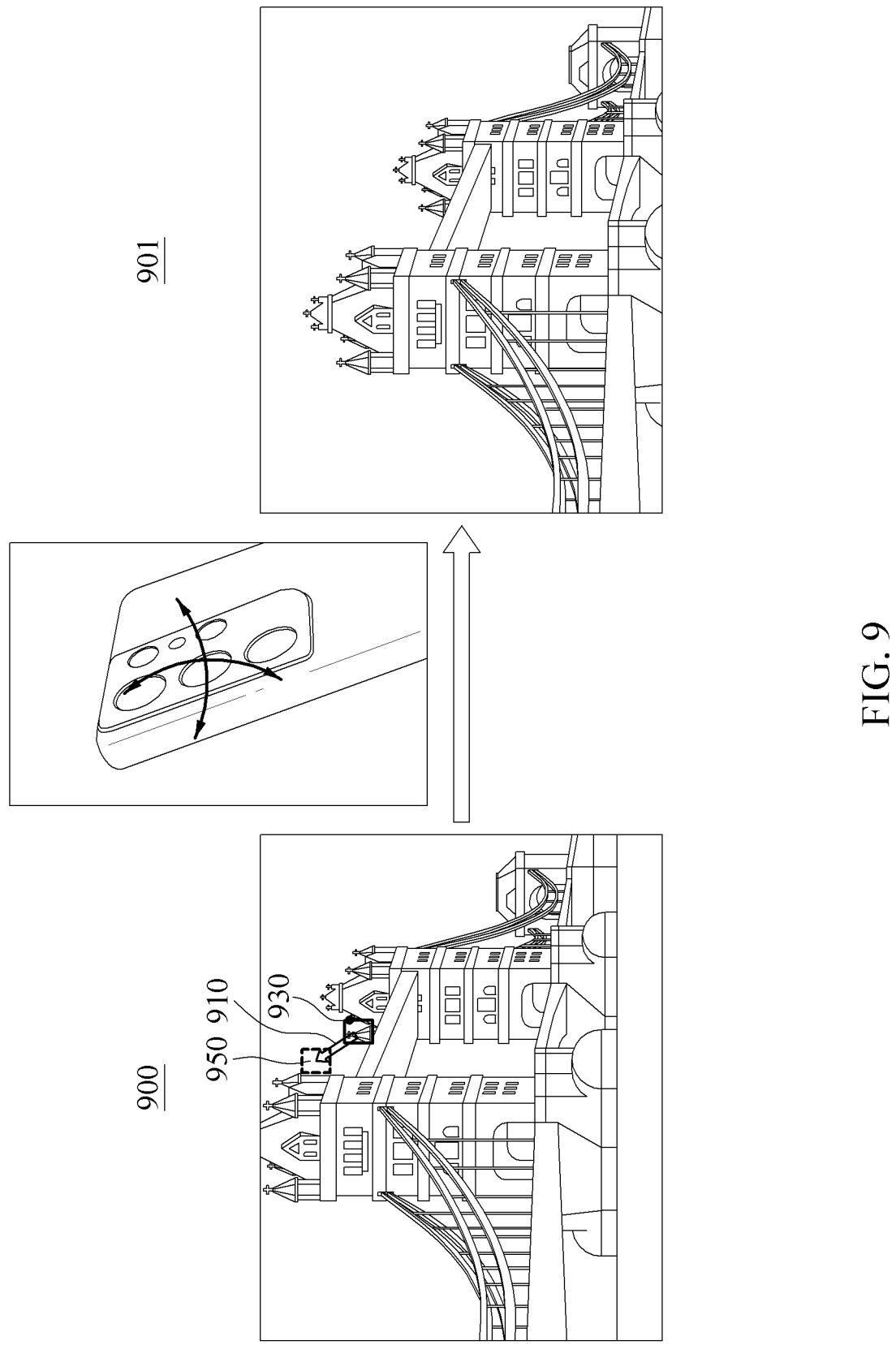
FIG. 9 illustrates an example of automatically causing a first reference point and a second reference point to match, according to one or more example embodiments.

FIG. 9 illustrates an example of automatically causing a first reference point and a second reference point to match, according to one or more example embodiments.

According to an example embodiment, when a first reference point and a corresponding second reference point do not match, the processor 1010 may adjust a pan, tilt, and/or zoom of a camera to cause the first reference point and the second reference point to match. The camera may be a pan-tilt-zoom (PTZ) camera, for example, capable of controlling direction change, enlargement, and reduction. Panning is a rotation leftward and rightward, tilting is an upward and downward rotation, and enlargement or reduction may be performed by zooming.

According to an example embodiment, the processor 1010 may cause the first reference point and the corresponding second reference point to match by adjusting a pan, tilt, and/or zoom of the camera. For example, when a second reference point 930 and a first reference point on a screen 900 do not match, moving the camera to a target position 950 may be required to match the second reference point 930 and the first reference point. In this example, the processor 1010 may display a first guide 910 on the screen 900. The processor 1010 may match a first reference point and a second reference point as illustrated in a screen 901 by adjusting a pan, tilt, and/or zoom without necessarily changing the position of the camera by the user (although user movement may be compensated for). The processor 1010 may thereby match the reference points automatically and allow the user to manipulate the camera less, and thus the user may more conveniently shoot an image or video relating to a hyperlapse video. In some implementations, the first guide may not be displayed, or another graphic indicating that automatic camera adjustment is occurring may be displayed. In implementations where the first guide 910 is displayed, the guide may be updated in real time as the PTZ camera is adjusted.

Figure 10:
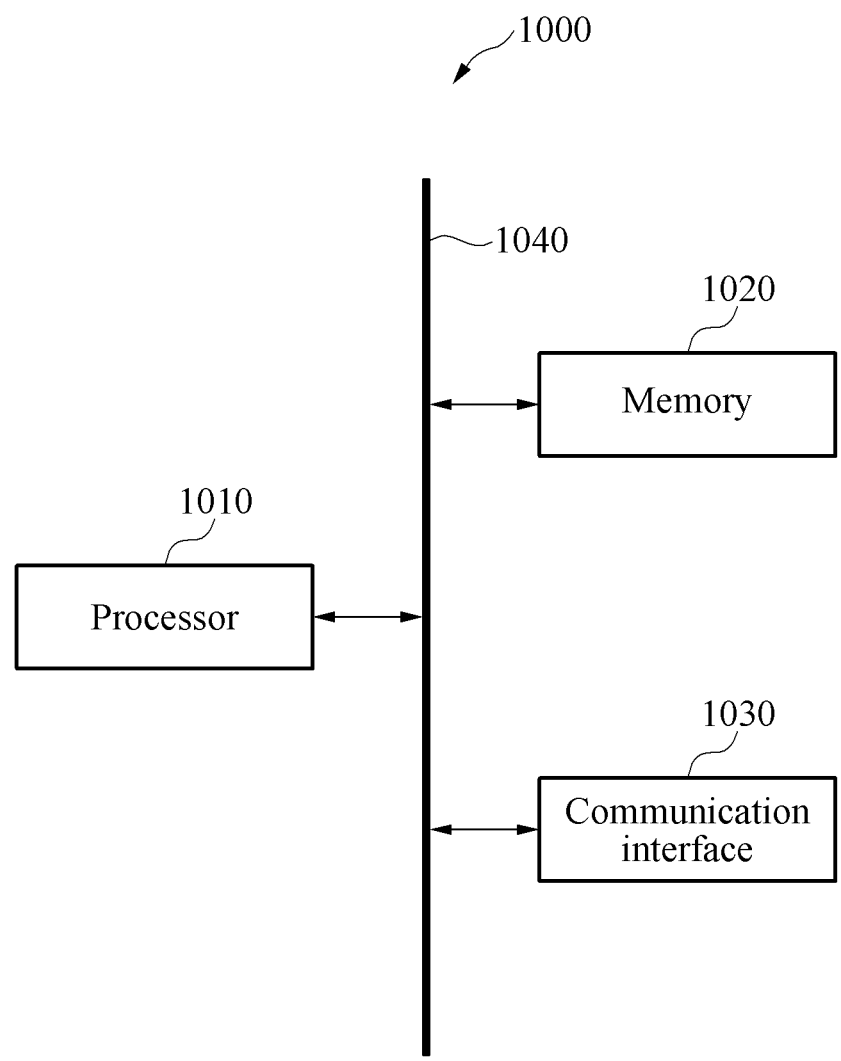
FIG. 10 illustrates an example electronic device, according to one or more example embodiments.

FIG. 10 illustrates an example electronic device according to one or more example embodiments.

Referring to FIG. 10, an electronic device 1000 may include the processor 1010, a memory 1020, and a communication interface 1030. The memory 1020, the processor 1010, and the communication interface 1030 may be connected to each other via a communication bus 1040. Although description above refers to "the processor 1010" in the singular, such description is for convenience and the single processor 1010 is representative of one or more processors.

The electronic device 1000 may be, or may be included in, a portable electronic device. The portable electronic device may be an electronic device a user may carry with them. The portable electronic device may be one of electronic devices, such as, for example, an ultra-mobile personal computer (UMPC), a workstation, a netbook, a personal digital assistant (PDA), a portable computer, a web tablet, a wireless phone, a mobile phone, a smartphone, an e-book, a portable multimedia player (PMP), a portable game console, a navigation device, a black box, and a digital camera.

The electronic device 1000 may further include a camera module. The camera module may shoot an image (e.g., a still image) and/or a video (e.g., a moving image). The camera module may include, for example, one or more lenses, image sensors, image signal processors (ISPs), or flashes.

The memory 1020 may store various pieces of information generated in a processing process of the processor 1010 described above. In addition, the memory 1020 may store various pieces of data and programs (in the form of instructions). The memory 1020 may include a volatile memory or a non-volatile memory. The memory 1020 may include a high-capacity storage medium such as a hard disk to store various pieces of data.

The processor 1010 may be a hardware-implemented device having a physically structured circuit to execute desired operations. The desired operations may include, for example, code or instructions included in a program. The hardware-implemented device may include, as non-limiting examples, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The processor 1010 may execute the program and control the electronic device 1000, and the code of the program to be executed by the processor 1010 may be stored in the memory 1020.

FIG. 11 illustrates an example of a camera module, according to one or more example embodiments.

Referring to FIG. 11, a camera module 1180 may include a lens assembly 1110, a flash 1120, an image sensor 1130, an image stabilizer 1140, a memory 1150 (e.g., a buffer memory), or an ISP 1160. The lens assembly 1110 may collect light emitted from an object which is a target from which an image is to be shot. The lens assembly 1110 may include one or more lenses. For example, the camera module 1180 may include a plurality of lens assemblies 1110. In this example, the camera module 1180 may be provided as, for example, a dual camera, a 360-degree camera, or a spherical camera. A portion of the lens assemblies 1110 may have the same lens properties (e.g., an angle of view, a focal length, an autofocus, an f number, or an optical zoom), or at least one of the lens assemblies 1110 may have one or more lens properties that are different from those of another portion of the lens assemblies 1110. The lens assembly 1110 may include, for example, a wide-angle lens or a telephoto lens.

The flash 1120 may emit light to be used to intensify light emitted or reflected from a subject (e.g., a target or an object). For example, the flash 1120 may include one or more light-emitting diodes (LEDs) (e.g., a red-green-blue (RGB) LED, a white LED, an infrared (IR) LED, or an ultraviolet (UV) LED), or a xenon lamp. The image sensor 1130 may obtain an image corresponding to the subject by converting the light emitted or reflected from the subject and transmitted through the lens assembly 1110 into an electrical signal. The image sensor 1130 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 1130 may be implemented using, for example, a charged coupled device (CCD) sensor or a complementary metal-oxide-semiconductor (CMOS) sensor.

The image stabilizer 1140 may move at least one lens included in the lens assembly 1110 or the image sensor 1130 in a specific direction, or control an operation characteristic (e.g., a read-out timing, etc.) of the image sensor 1130, in response to a movement of the camera module 1180 or the electronic device 1000 including the camera module 1180. This may compensate for at least a portion of negative effects of the movement on an image to be shot. According to an example embodiment, the image stabilizer 1140 may sense such a movement of the camera module 1180 or the electronic device 1000 using a gyro sensor (not shown) or an acceleration sensor (not shown) arranged inside or outside the camera module 1180. The image stabilizer 1140 may be implemented as, for example, an optical image stabilizer. The memory 1150 may at least temporarily store therein at least a portion of images obtained through the image sensor 1130 for a subsequent image processing operation. For example, when obtaining an image is delayed by a shutter or a sequence of images is obtained at a high speed, an obtained original image (e.g., a Bayer-patterned image or a high-resolution image) may be stored in the memory 1150 and a copy image (e.g., a low-resolution image) corresponding the original image may be previewed through a display. Subsequently, when a specified condition (e.g., a user input or a system command) is satisfied, at least a portion of the original image stored in the memory 1150 may be obtained and processed by the ISP 1160. According to an example embodiment, the memory 1150 may be configured as at least a portion of the memory 1020 of FIG. 10 or as a separate memory operating independently thereof.

The ISP 1160 may perform one or more image processing operations on images obtained through the image sensor 1130 or stored in the memory 1150. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening). Additionally or alternatively, the ISP 1160 may control one or more of the components (e.g., the image sensor 1130)

included in the camera module 1180. For example, the ISP 1160 may control an exposure time, a read-out timing, and the like. An image processed by the ISP 1160 may be stored back in the memory 1150 for further processing, or be provided to an external component (e.g., the memory 11020 of FIG. 10 and the processor 1010) of the camera module 1180. According to an example embodiment, the ISP 1160 may be configured as at least a portion of a processor (e.g., the processor 1010) or as a separate processor operating independently of the processor. For example, when the ISP 1160 is configured as a processor separate from the processor, one or more images processed by the ISP 1160 may be displayed by a display as-is or as changed after additional image processing is performed by the separate processor.

According to an example embodiment, the electronic device 1000 may include a plurality of camera modules 1180 having different properties or functions. In this case, at least one of the camera modules 1180 may be a wide-angle camera, and at least another one of the camera modules 1180 may be a telephoto camera, for example. Similarly, at least one of the camera modules 1180 may be a front camera, and at least another one of the camera modules 1180 may be a rear camera.

The computing apparatuses, the electronic devices, the processors, the memories, the image sensors, the displays, the information output system and hardware, the storage devices, and other apparatuses, devices, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method, performed by a device, of generating a hyperlapse video, the method comprising:
   comparing a first reference point of a first image captured by the device and a corresponding second reference point of a second image repeatedly captured by the device;
   based on the comparing indicating that the first reference point does not match the second reference point, displaying a first user interface with a graphic element based on a difference between the first reference point and the second reference point or based on an orientation of the device; and
   determining to perform automatic shooting for the hyperlapse video based on the comparing indicating that the first reference point and the second reference point match, wherein the automatic shooting is permitted to occur regardless of the location of the device.

2. The method of claim 1, further comprising:
   automatically identifying candidate points in an image; and
   determining a reference point from among the candidate points based on a user input selecting the reference point.

3. The method of claim 2, wherein a candidate point is identified based on a bounding box of an object detected in the image.

4. The method of claim 2, wherein the candidate point is identified based on being positioned on or within the bounding box.

5. The method of claim 1, wherein the second reference point is identified by tracking a point corresponding to the first reference point in the second image.

6. The method of claim 1, further comprising:
   displaying the first user interface based on a determination that the first reference point does not match the second reference point; and
   determining whether a camera is horizontal when the first reference point and the corresponding second reference point match.

7. The method of claim 1, further comprising:
   based on a determination that the first reference point and the corresponding second reference point do not match, causing the first reference point and the second reference point to match by automatically adjusting a pan, tilt, or zoom of a camera.

8. The method of claim 1, further comprising:
   displaying a second user interface representing horizontal status of a camera, wherein the displaying the second user interface is based on the comparing.

9. The method of claim 8, further comprising:
   performing the automatic shooting based on the horizontal status of the camera.

10. The method of claim 8, further comprising:
    performing the automatic shooting responsive to determining that the camera is horizontal; and
    responsive to determining that the camera is not horizontal, displaying the second user interface.

11. The method of claim 2, further comprising:
    determining a camera-setting value of a camera in association with the determining of the reference point; and
    fixing the determined camera-setting value.

12. The method of claim 11, wherein the determining the camera-setting value comprises determining a frame rate based on the reference point.

13. The method of claim 11, wherein the fixing the camera-setting value comprises fixing a white balance value or an exposure time of the camera.

14. The method of claim 11, wherein the fixing the camera-setting value comprises fixing a sensitivity value or an aperture value of the camera.

15. The method of claim 1, wherein the automatic shooting comprises shooting a sequence of images or video frames without a user input initiating the shooting.

16. The method of claim 1, wherein the performing the automatic shooting comprises automatically focusing using an autofocus function.

17. An electronic device, comprising:
    a camera;
    one or more processors;
    storage storing instructions configured to, when executed by the one or more processors, cause the one or more processors to:
    compare a first reference point of a first image captured by the camera and a corresponding second reference point of a second image repeatedly captured by the camera;
    based on the comparing indicating that the first reference point does not match the second reference point, display a first user interface for matching the first reference point and the second reference point; and
    perform automatic shooting based on the comparing indicating that the first reference point and the second reference point match, wherein the automatic shooting is permitted to occur regardless of the location of the device.

18. The electronic device of claim 17, wherein the instructions are further configured to cause the one or more processors to:
   determine candidate points in an image; and
   determine a reference point from among the determined candidate points based on a user selection input.

19. The electronic device of claim 17, wherein the instructions are further configured to cause the one or more processors to:
   display the first user interface responsive to a determination that the first reference point and the corresponding second reference point do not match.

20. A method of generating a hyperlapse video in a portable electronic device comprising a camera and a display, the method comprising:
   obtaining a first image through the camera when the portable electronic device is at a first position;
   determining candidate points in the first image;
   displaying the determined candidate points on the display;
   determining one of the candidate points to be a first reference point based on a user selection input; and
   repeatedly obtaining a second image through the camera when the portable electronic device is moving; and
   repeatedly determining a second reference point of the second image based on a reference object detected in the second image; and
   performing automatic shooting responsive to determining that the first reference point and the second reference point match, where the automatic shooting is permitted for any location of the portable electronic device, and wherein the location at which the first image was captured differs from the location at which the second image of the match second reference point was captured.

21. The method of claim 20, further comprising:
   responsive to determining that the first reference point and the second reference point do not match, displaying a first user interface on the display.

* * * * *